(12) United States Patent
Wu et al.

(10) Patent No.: US 8,099,119 B2
(45) Date of Patent: Jan. 17, 2012

(54) HYBRID, MULTIPLE CHANNEL, AND TWO-STEP CHANNEL QUALITY INDICATOR (CQI) FEEDBACK SCHEMES

(75) Inventors: Xiaoxin Wu, Beijing (CN); Guangjie Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 12/186,722

(22) Filed: Aug. 6, 2008

(65) Prior Publication Data

US 2010/0035644 A1  Feb. 11, 2010

(51) Int. Cl.
*H04B 7/00* (2006.01)
(52) U.S. Cl. ............ 455/517; 455/450; 455/67.13; 370/252
(58) Field of Classification Search ............ 455/450, 455/513, 67.13, 67.11, 69, 509, 517, 464; 370/329, 252, 208, 343; 375/260, 227, 267, 375/337
See application file for complete search history.

(56) References Cited

U.S. PATENT DOCUMENTS

| | | | |
|---|---|---|---|
| 2008/0240030 A1* | 10/2008 | Kolding et al. | 370/329 |
| 2009/0046674 A1* | 2/2009 | Gao et al. | 370/337 |
| 2009/0191882 A1* | 7/2009 | Kovacs et al. | 455/450 |
| 2009/0257356 A1* | 10/2009 | Frederiksen et al. | 370/252 |
| 2010/0041344 A1* | 2/2010 | Kim et al. | 455/69 |
| 2010/0233968 A1* | 9/2010 | Roh et al. | 455/67.13 |
| 2011/0013506 A1* | 1/2011 | Ishii et al. | 370/208 |

* cited by examiner

*Primary Examiner* — Sujatha Sharma
(74) *Attorney, Agent, or Firm* — Alan Pedersen-Giles (57) ABSTRACT

A method providing channel quality indicator (CQI) feedback from subscriber stations (SSs) to a base station (BS) may include a combination of a thresholding scheme and a best-M scheme. Another method providing CQI feedback may include providing multiple feedback channels, with SSs randomly allocating CQI values among the multiple feedback channels. The BS may choose a prevailing CQI message when channel contention occurs. Another method of providing CQI feedback may include SSs transmitting to the BS numbers of their CQI values that exceed a CQI threshold. Based on these numbers, the BS may determine how many CQI values each SS may send, and on which channels. The SSs may send these CQI values according to instructions from the BS.

16 Claims, 6 Drawing Sheets

HYBRID, MULTIPLE CHANNEL, AND TWO-STEP CHANNEL QUALITY INDICATOR (CQI) FEEDBACK SCHEMES

BACKGROUND

Implementations of the claimed invention generally may relate to wireless communication, and in particular to schemes for feeding back channel quality indicator (CQI) information to a base station.

In various wireless protocols, subscriber stations (SSs) may send back CQI information to a base station (BS) that may indicate a quality or strength of a communication channel or subchannel. Such CQI information may be used by the BS for scheduling and other message delivery tasks. Various schemes have been proposed to deliver CQI information from SSs to a BS.

One such scheme may be for all SSs to send CQI information for most of all of their available channels to the BS. Such an approach may use too much upstream bandwidth, depending on the number of channels. In another "thresholding" scheme, SSs may send only that CQI information that exceeds a certain threshold value. In another "best M" scheme, SSs may send only that CQI information to the BS for their M (an integer that is one or more) channels that that have the highest values.

Such straightforward CQI feedback schemes, however, may be less than optimal for various reasons.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
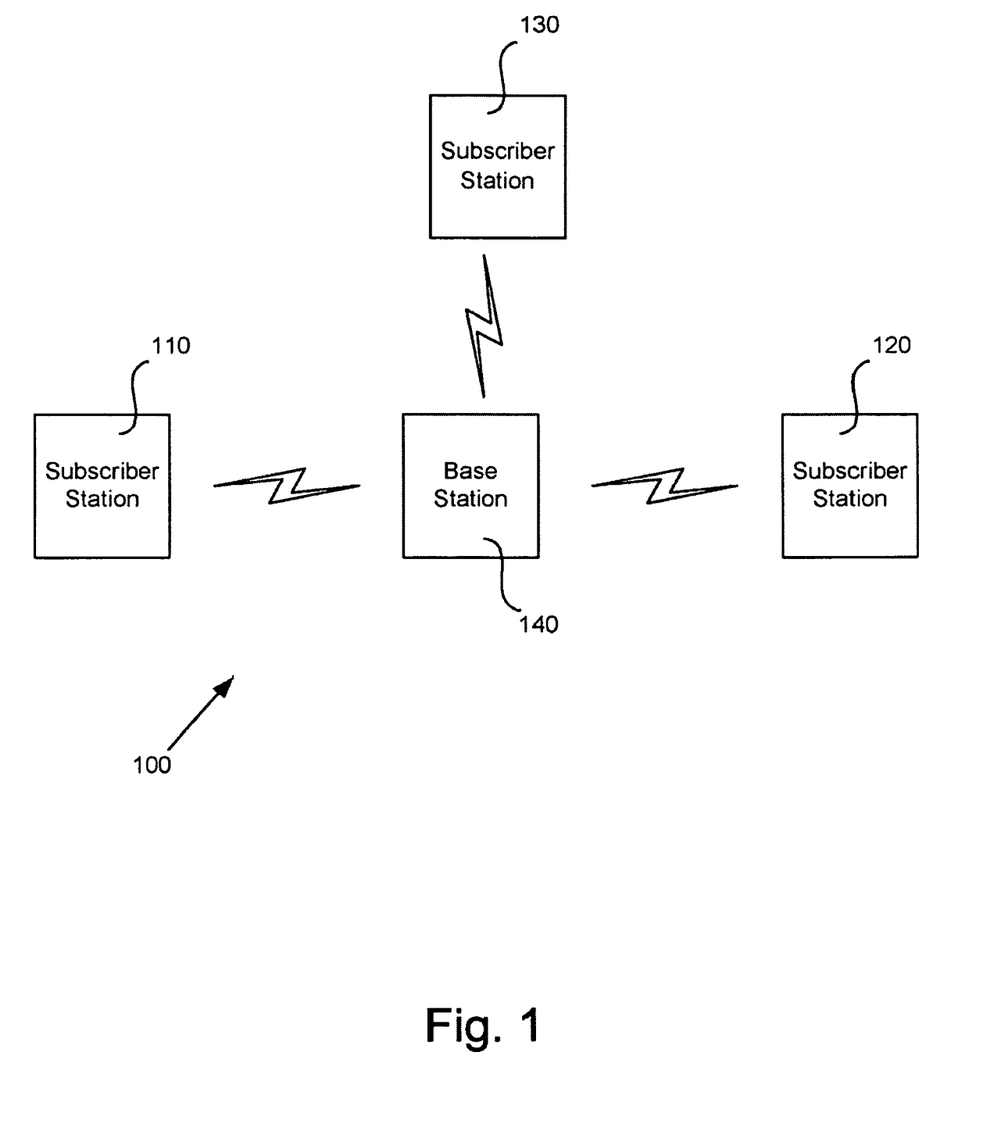
FIG. 1 illustrates an example wireless communication system according to some implementations.

FIG. 1 is a diagram illustrating an example of a wireless system 100 in accordance with one implementation consistent with the principles of the invention. System 100 may include subscriber stations (SSs) 110-130, and base station 140. Although only three SSs (which may also be referred to as mobile stations (MSs)) are shown, many more (e.g., tens or hundreds) may be in system 100. SSs 110-130 may be any combination or type of nodes typically found in a wireless system 100. As is known, SSs may determine values (e.g., CQI values) that indicate channel quality among a number of communication channels or subchannels.

Base station 140 may coordinate (e.g., schedule) communication with SSs 110-130 via different wireless communication channels. Those channels from SS to BS may be referred to as upstream channels (or uplinks), while those from BS to SS may be referred to as downstream channels (or downlinks). In some implementations, base station 140 may allocate channels and associated bandwidth among SSs 110-130 based on CQI information received (e.g., fed back) from the SSs. The particular communication protocol and modulation scheme to define the communication channels used in system 100 may correspond to now-known or later-developed wireless communication protocols that support CQI feedback. In some implementations, the communication protocol may be IEEE 802.16(e)-2005, long term evolution (LTE), or variants thereof.

System 100 may employ one or more of several modified CQI feedback schemes as described below.

One implementation of a CQI feedback scheme may reduce a CQI feedback load on system 100 while also keeping a certain level of fairness. A combination of a threshold cutting-off CQI feedback scheme and a best-M CQI feedback scheme may be used for CQI feedback. Threshold feedback may reduce the overall feedback load while keeping system throughput high. In contrast, the best-M feedback, as a complementary part of the CQI feedback procedure with threshold feedback, will allow the SSs with low channel quality to have a chance to send back their CQI values. In this sense, the best-M portion of the combined CQI feedback scheme may add a measure of fairness, while the threshold portion of the combined CQI feedback scheme may maintain relatively high throughput of system 100.

Figure 2:
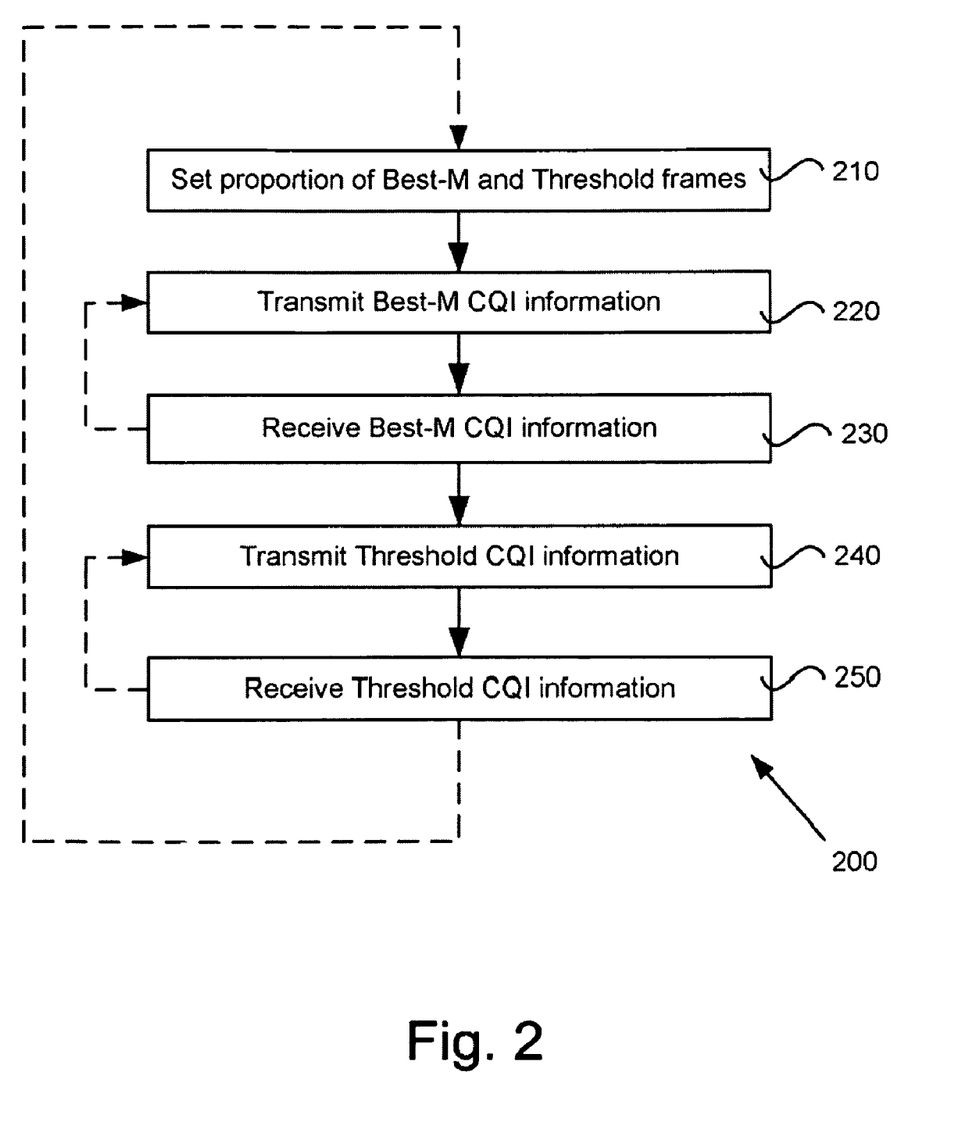
FIG. 2 illustrates a method of combining CQI feedback schemes.

FIG. 2 illustrates a method of combining CQI feedback schemes. Although described with respect to FIG. 1 for ease of explanation, the scheme described in FIG. 2 should not be construed as limited to the particulars of this figure.

Processing may begin with BS 140 setting a proportion of best-M CQI feedback verses threshold CQI feedback that it wants SSs 110-130 to deliver [act 210]. In some implementations, BS 140 may specify parameters such as the number M and/or the threshold to be used by SS 110-130 at various times. BS 140 may also assign radio blocks (RB) (e.g., upstream communication units) via a fairness scheduling algorithm (e.g., proportional fairness (PF) algorithm).

In some implementations, act 210 may predefine which frames will use each different CQI feedback scheme (e.g., best-M or threshold). For example, BS 140 may specify in act 210 that a particular type of CQI feedback be periodic, appearing once or more in several communication frames.

Processing may continue with SSs 110-130 using a best-M for CQI feedback for one or more frames or other communication units [act 220]. In this case, each of SSs 110-130 may send the best M (an integer, such as 3 or 5) of their CQI values to BS 140. In act 220 an SS that may not otherwise send any CQI information under a threshold scheme may send some CQI information under best M.

In response BS 140 may receive the best M CQI feedback from SSs 110-130 [act 230]. Also in act 230, BS 140 may allocate with RBs or other upstream communication units and/or channels to SSs 110-130 based on the best M feedback received in act 220. To the extent that BS 140 directed that the best M CQI feed back scheme be used for multiple frames in a row, acts 220 and 230 may be repeated for all such frames that are supposed to be best-M. This repeating for several adjacent frames is illustrated as a dashed line between acts 220 and 230 in FIG. 2.

Processing may continue with SSs 110-130 using a thresholding scheme for CQI feedback for one or more frames or other communication units [act 240]. At certain frames, only the CQI values above a threshold may be sent by SSs 110-130. SSs with bad channel quality (e.g., CQI values that fall below the threshold) may not send any CQI information at all in act 240. The threshold CQI feedback scheme may results in a smaller CQI feedback volume and a higher system throughput, relative to a non-threshold scheme.

BS 140 may receive the thresholded CQI feedback from SSs 110-130 [act 250]. Also in act 250, BS 140 may allocate with RBs or other upstream communication units and/or channels to SSs 110-130 based on the thresholded CQI feedback received in act 240. To the extent that BS 140 directed that the threshold CQI feed back scheme be used for multiple frames in a row, acts 240 and 250 may be repeated for all such frames that are supposed to be threshold-type feedback. This repeating for several adjacent frames is illustrated as a dashed line in FIG. 2. After the CQI feedback information is received by BS 140, it may use such CQI feedback to schedule and/or assign available subchannels among the SSs.

It should be noted that, although acts 220 and 230 are illustrated before acts 240 and 250 in FIG. 2, they may be performed in a different order. For example, BS 140 may choose to have the SSs perform threshold CQI feedback first, instead of best-M as shown in the figure.

Also, BS 140 may adjust the proportion of best-M to threshold-based CQI feedback from time to time, as conceptually illustrated in FIG. 2 by the dashed line between acts 250 and 210. The ratio between the number of frames using threshold feedback and the number of frames using best-M feedback over a certain time may be denoted as R.

The overall performance of the hybrid or combined CQI feedback approach may be adjusted by BS 130 via changing this ratio R. If R is large, which means that the threshold feedback is used in more frames, system 100 results in a low CQI feedback load and high throughput performance. The cost to such a large R value is losing some degree of the fairness, which is due to less opportunity for an SS with poor channel quality to send back CQI information, such having been precluded by the threshold in most frames. Conversely, if the ratio R is made small be BS 140, the overall system performance becomes closer to that of best-M, under which a better fairness can be obtained at the cost of system throughput. In an implemented system 100, the combining ratio R may be set according to different service requirements for the system.

Another implementation of a CQI feedback scheme may reduce a CQI feedback load on system 100 while maintaining throughput via multi-channel message contention. In a basic or typical threshold cutting-off CQI feedback scheme, it may be difficult to predict which of SSs 110-130 may send back CQI information, and over which subchannel the SS will send the CQI information to BS 140. Also, CQI delivery based on a pre-allocated CQI feedback channel for each of SSs 110-130 is not feasible due to limited channel resources. The multi-channel scheme described herein may permit the CQI messages to be delivered at relatively low cost (e.g., low bandwidth occupation and less system complexity).

Such a "multi-channel contention" scheme may reserve a fixed number of uplink channels for contention-based CQI feedback. In this scheme, an active SS that has to send back CQI for a number subchannels may randomly select the same number among the multiple feedback channels over which to send the CQI messages. For each feedback channel, if only one CQI message is sent, that message will be delivered to BS 140 successfully. If more than one CQI message is sent through the same channel, BS 140 is able to detect the contending CQI message with the best signal quality via known signal detection techniques.

Figure 3:
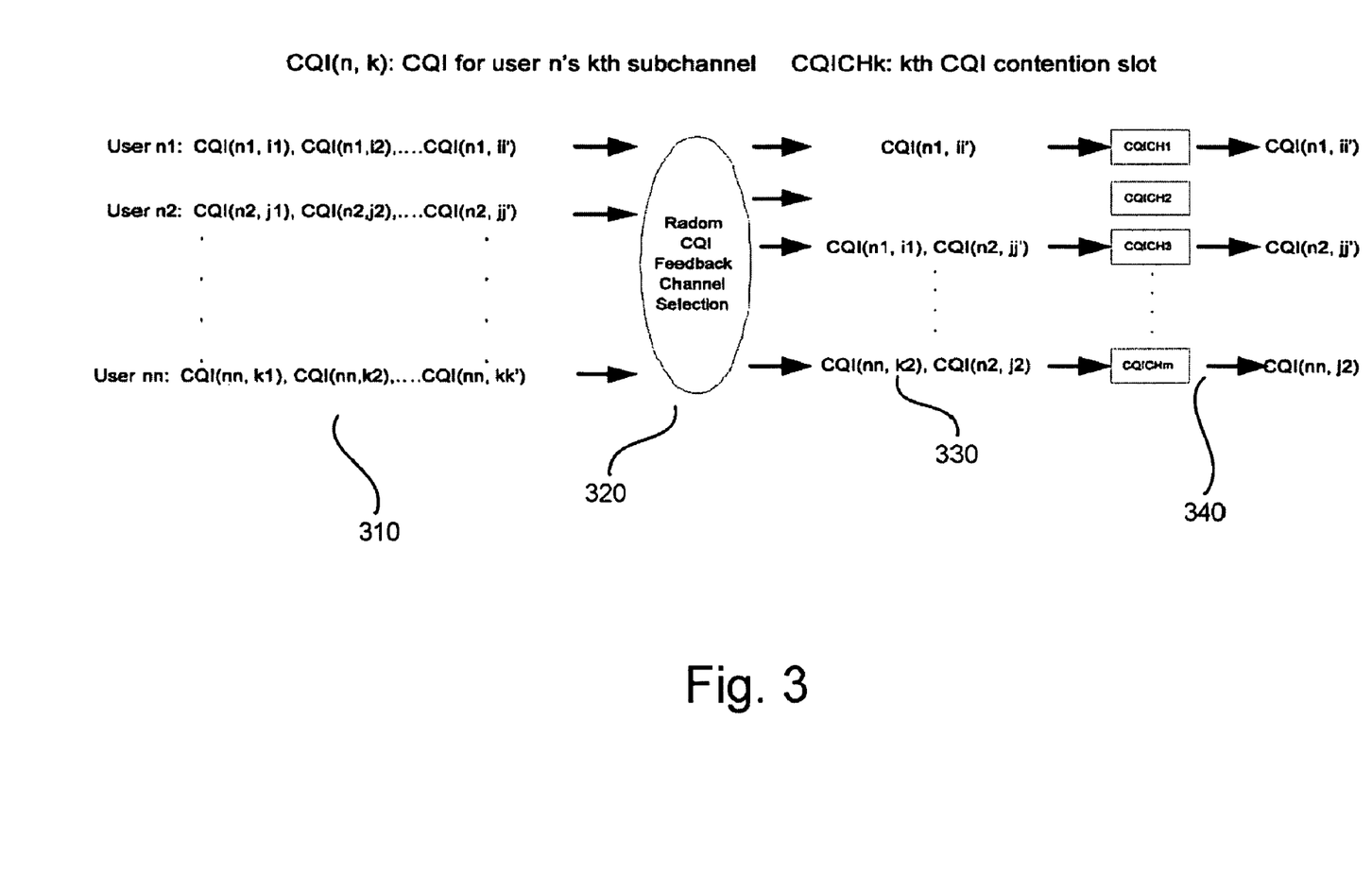
FIG. 3 conceptually illustrates a scheme for multi-channel CQI feedback.

FIG. 3 conceptually illustrates such a scheme for multi-channel CQI feedback with possible message contention. At 310, a number, n, of SSs have a few CQI values greater than the threshold. At 320, they randomly (or pseudo-randomly) select a CQI feedback channel among the multiple available feedback channels for delivery of each CQI feedback message. 330 illustrates a specific example of transmission over the multiple feedback channels (arranged vertically for ease of presentation and understanding). In the first feedback channel (CQICH1), only one CQI message is transmitted in the channel, so this message will likely be successfully received by BS 140 at 340. In the third and $m^{th}$ feedback channels (CQICH3 and CQICHm), two CQI messages (from different SSs) are transmitted, and the channels are thus contended for by the two competing messages. Thus, one of the contending CQI messages per feedback channel will likely survive and be received by BS 140 at 340. By contrast, in the second feedback channel (CQICH2), no CQI message is transmitted due to random assignment of the messages to other channels by the SSs. In this case and at this particular time, the second feedback channel is not utilized.

As a purely exemplary numerical example, a system 100 may have about 25 SSs, about 24 subchannels, and about two streams per subchannel. In such an example system, there may be between about 100 and 250 feedback channels over which the 25 SSs randomly distribute the thresholded CQI values for their 24 or so subchannels.

Figure 4:
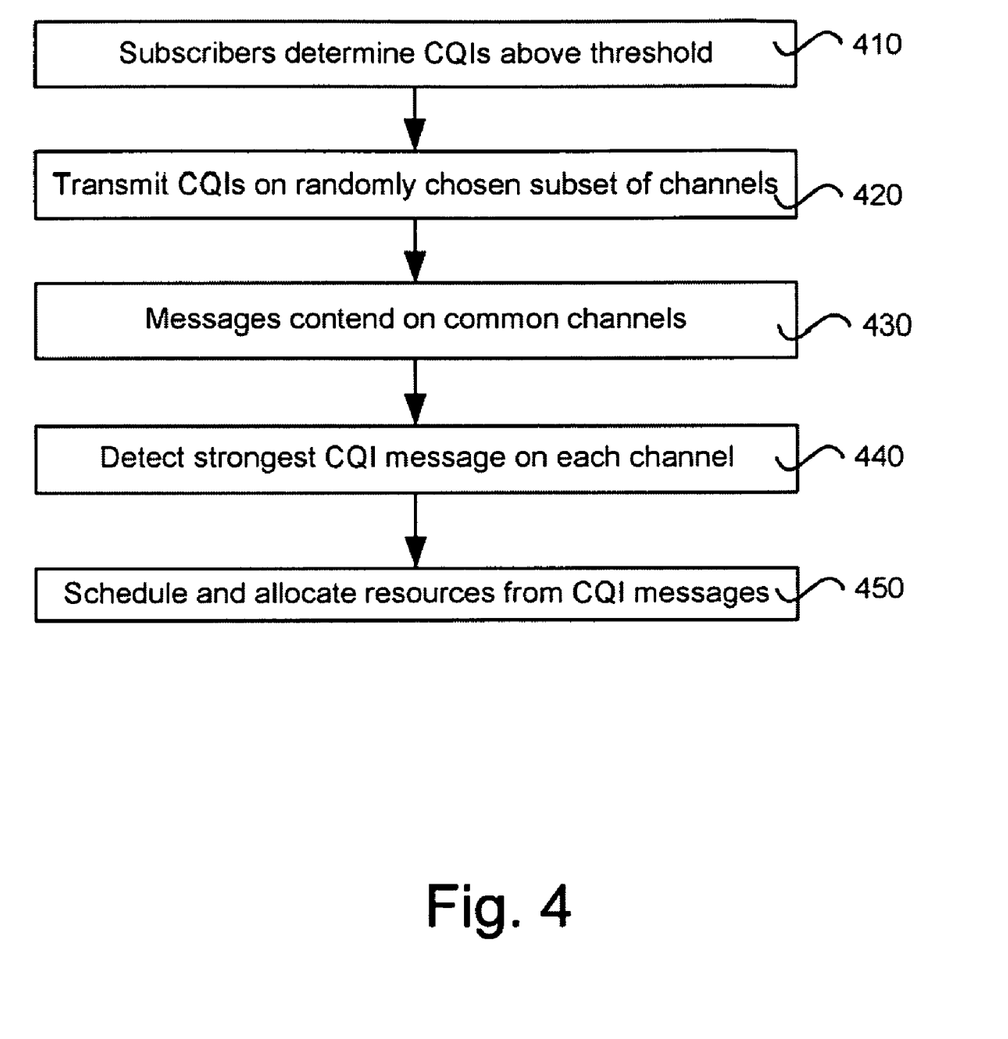
FIG. 4 illustrates a method corresponding to the scheme in FIG. 3.

FIG. 4 illustrates a method corresponding to the scheme in FIG. 3. BS 140 may provide the SSs with a threshold value for comparing with CQI values. SSs 110-130 (for example; there may be many more SSs than three) may determine which of their CQI values for the various available subchannels exceed a threshold value [act 410]. This may produce a set of CQI values for each SS that are all above the chosen threshold, which may be set by BS 140. Each SS may choose and transmit its set of CQI values on a randomly (or pseudo-randomly) set of corresponding feedback channels [act 420]. The SSs may choose any subset of a predetermined number of (multiple) feedback channels that correspond to the number of thresholded CQI values that they have to send. The SSs make such choice without regard to choices other SSs have made, creating the potential for channel contention between or among CQI messages from different SSs.

At act 430, the CQI messages are transmitted, more or less concurrently (e.g., synchronously), on the various feedback channels. Where more than one message is transmitted on a particular feedback channel, these may interfere, and thus content, for that channel. BS 140 may then detect the CQI messages on the various feedback channels [act 440]. If there are more than one CQI message on a given feedback channel, BS 140 may detect (e.g., via amplitude-based, power-based, noise-based, or other techniques) the "strongest" (e.g., having the best signal quality) one of these contending messages. In some implementations, however, BS 140 may be able to detect the strongest n (e.g., two or more) of contending CQI messages on a channel in act 440. BS 140 may then use the various detected CQI messages to schedule and/or assign subchannels among the SSs [act 450].

Such a multi-channel, contention-based CQI delivery scheme may work well with the threshold cutting-off CQI feedback, as no feedback channel has to be pre-allocated. Also, CQI thresholds limit the number of contenders, and thus reduce the load for BS 140 to reconstruct a valid CQI message.

Further, setting CQI thresholds ensures that only CQIs indicating subchannels of good quality will contend for the feedback channel, which in turn indicates that a successfully delivered CQI message normally carries a relatively high CQI value. This is important for BS scheduling, as otherwise low CQI values may also contend and be the winner. In that case, the low CQI values may be the only information that the BS can obtain, and the resulting system throughput will be low.

Finally, a multi-channel contention scheme may be generally superior to a single-channel CQI feedback contention scheme. In the single-channel scheme, SSs that have the CQI messages for a subchannel to send will contend for that specific channel. In the single-channel contention scheme, for each subchannel, only one CQI message can be successfully delivered, and this message probably does not carry the best CQI for that subchannel. Hence, the multi-channel contention will generally have better performance (e.g., resulting throughput of system 100).

A final implementation of a CQI feedback scheme may reduce an upstream CQI feedback load on system 100 via a two-step signaling handshake. As explained earlier, in a thresholding feedback scheme (as opposed to best-M, where the per-SS message number M is known), it is difficult to predict which SS will send CQI feedback to BS 140 and how many CQI values it will send. A two-Step CQI feedback scheme may address this uncertainty. In the first step of this scheme, in the current frame BS 140 sends the CQI threshold in the downlink to SSs 110-130. In the uplink, the SSs do not send back CQI values. Instead, they each send the number of CQIs having values are above that threshold.

Figure 5:
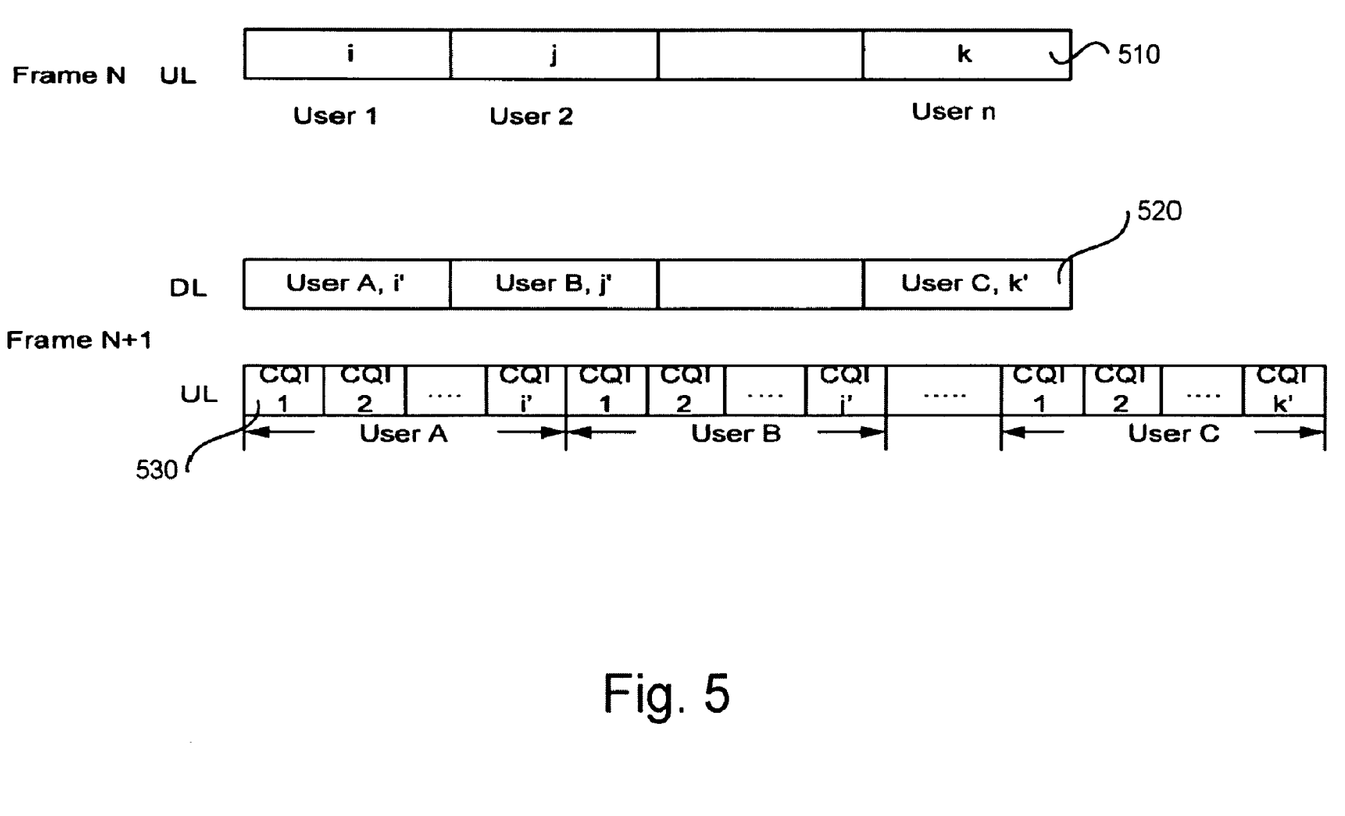
FIG. 5 conceptually illustrates a scheme for two step CQI feedback.

FIG. 5 conceptually illustrates a scheme for two step CQI feedback. As shown in FIG. 5, in a newly coming frame (which is Frame N), all of the users, including User 1, User 2, . . . and User n, send back the information 510 how many of their CQI values are above the threshold (e.g., i, j, . . . k respectively). The uplink bandwidth allocated for these SSs to send the information is predefined. A SS can be assigned with this bandwidth when it registers to the system 100.

In the next frame (Frame N+1), BS 140 may first determine for each SS 110-130 how many CQI messages the SS should send. In some implementations, based on CQI channel capacity, a SS may not send all the CQIs that are above the threshold if there are too many large CQI values. In some implementations, an SS that has no CQI value greater than the threshold may also be requested to send back CQI if CQI feedback channel is not fully occupied. BS 140 then reserve the bandwidth for each of the users, and through the downlink 520 it may indicate to each of the SSs (e.g., A, B, . . . C) how many CQI values they should feedback (e.g., i', j', . . . k') and which part of the signaling bandwidth they should use.

In the uplink 530 of Frame N+1, a SS may find the positions (e.g., the CQI delivery channels) where it will send CQI values, and may fit the CQI values in those positions. BS 140 can tell from which SS the CQI information originates. Subchannel indication, however, should be present in this message.

Figure 6:
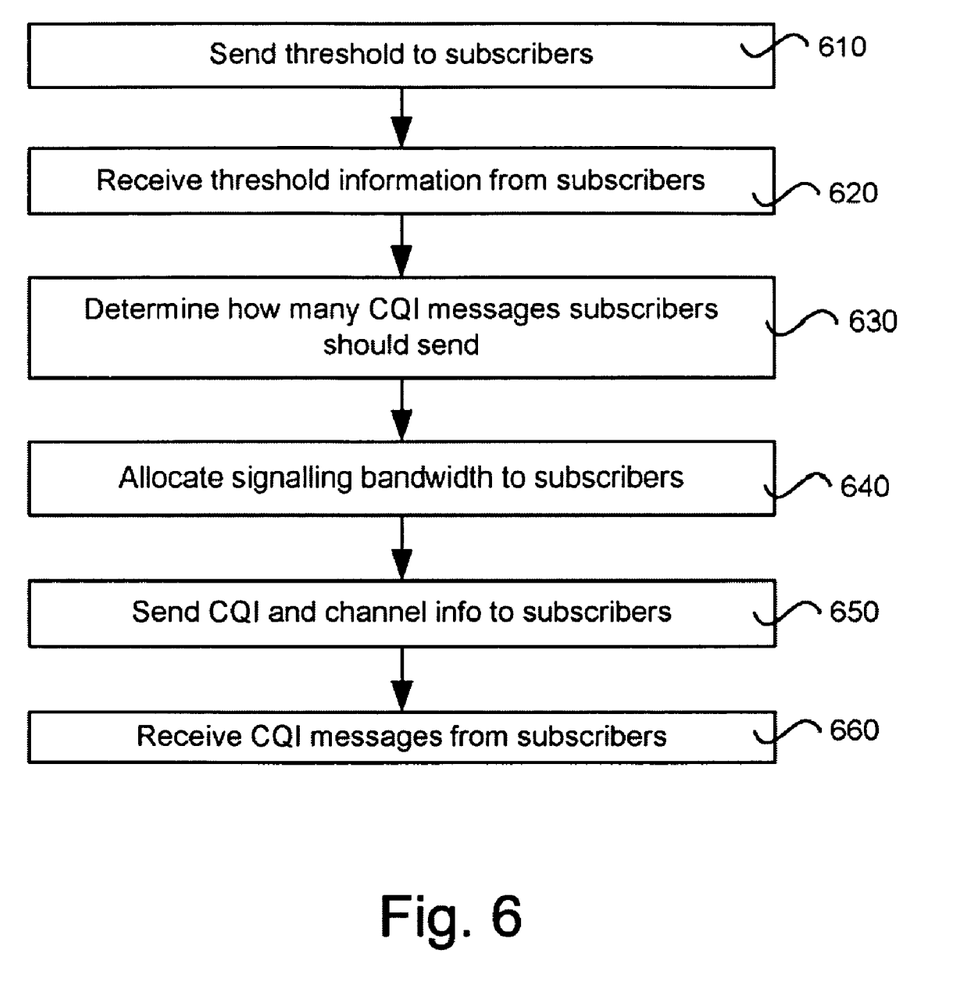
FIG. 6 illustrates a method corresponding to the scheme in FIG. 5.

FIG. 6 illustrates a method corresponding to the scheme in FIG. 5. The process may begin with BS 140 sending the threshold to be used in evaluating CQI values to SSs 110-130 [act 610]. Using this threshold information, SSs 110-130 may determine the number of CQI values exceeding the threshold value and may each send this number to BS 140 in bandwidth that has been pre-allocated for such purpose. BS 140 may receive these per-SS CQI threshold counts [act 620].

Based on the counts received in act 620 and on other scheduling and throughput considerations, BS 140 may determine how many CQI messages each SS should send [act 630]. For example, BS 140 may determine that for a desired system throughput, a desired number of CQI values may be sent from all SSs. BS 140 may distribute this desired number of CQI values among specific allocated numbers for each SS. In some cases, the allocated numbers (e.g., i', j', . . . k' in FIG. 5) may be less than the corresponding reported values (e.g., i, j, . . . k in FIG. 5). For any given SS, however, the allocated number may be as high as equal to the number of CQI values that exceed the threshold.

BS 140 also may allocate portions of the available CQI feedback bandwidth/channels to various SSs [act 640]. BS 140 may send the allowable number of CQI messages and the bandwidth allocation determined in acts 630 and 640 to the SSs [act 650]. If this allocated number is less than the total number of CQI messages a particular SS has available, the SS may choose via a predefined mechanism (e.g., first n, strongest n, etc.).

SSs 110-130 may send, and BS 140 may receive, the specified numbers of CQI messages in the allotted upstream bandwidth [act 660]. BS 140 may determine from which SS these messages originated, but as part of the CQI information, the SSs may include which subchannels the various CQI values refer to.

In contrast to a Best-M signaling scheme, the above-described two-step scheme may use significantly less uplink bandwidth for CQI feedback (due to BS 140 actively limiting such) at the expense of some added downlink signaling from BS 140. There is no downlink data requirement for a Best-M, but to reach the same system throughput, a Best-M scheme has much higher uplink data rate requirement. It should be noted that uplink signaling bandwidth is normally considered more precious than the downlink, which can take advantage of broadcasting.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although certain values (e.g., a threshold) may be disclosed as being sent from BS 140 at certain times, such values may also be sent to the SSs at other times, such as upon registration to system 100. Other reasonable signaling and timing variations are both possible and contemplated.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method of receiving channel quality indicator (CQI) feedback, comprising:
   transmitting instructions that specify a first set of frames that include CQI feedback determined by a threshold scheme and a second set of frames that include CQI feedback determined by a best M scheme;
   receiving the first set of frames that include first CQI feedback values above a threshold; and
   receiving the second set of frames that include an integer number M of second CQI feedback values.

2. The method of claim 1, wherein the transmitting includes:
   specifying a proportion between the first set and the second set in the instructions.

3. The method of claim 1, wherein the transmitting includes:
   specifying a first number of frames in the first set and a second number of frames in the second set in the instructions.

4. The method of claim 1, further comprising:
   determining the first set of frames and the second set of frames via a proportional fairness algorithm.

5. The method of claim 1, further comprising:
   transmitting the threshold and the integer number M to a group of subscriber stations.

6. The method of claim 1, further comprising:
   assigning communication channels to subscriber stations based on the first CQI feedback values and the second CQI feedback values.

7. A method of receiving channel quality indicator (CQI) feedback, comprising;
   specifying a number of CQI feedback channels and a CQI threshold value;
   receiving CQI feedback messages on the number of CQI feedback channels, including:
      resolving contention if two messages are present on the same CQI feedback channel; and
   assigning communication channels to subscriber stations based on the received first CQI feedback messages.

8. The method of claim 7, wherein the resolving includes choosing a message of the two messages that has a better signal quality.

9. The method of claim 7, further comprising:
   determining a set of CQI feedback values that exceed the CQI threshold value.

10. The method of claim 9, further comprising:
    transmitting the set of CQI feedback values on randomly chosen corresponding ones of the number of CQI feedback channels.

11. The method of claim 7, wherein the number of CQI feedback channels is between about 100 and 250.

12. A method of receiving channel quality indicator (CQI) feedback, comprising;
    receiving count values from subscriber stations that indicate how many CQI values exceeded a CQI threshold at each subscriber station;
    determining how many CQI values each subscriber station may send based on the count values;
    sending an allocation number of CQI values to each subscriber station; and
    receiving CQI values from the subscriber stations in quantities corresponding to their respective allocation numbers.

13. The method of claim 12, further comprising:
    sending the CQI threshold to the subscriber stations.

14. The method of claim 12, wherein the determining includes:
    allocating feedback signaling bandwidth among the subscriber stations.

15. The method of claim 12, wherein the sending includes:
    sending an allocated feedback bandwidth to each subscriber station.

16. The method of claim 12, wherein the determining determines how many CQI values each subscriber station may send based on the count values and based on a desired total number of CQI values from all subscriber stations.

* * * * *